United States Patent
Li et al.

(10) Patent No.: US 9,120,961 B2
(45) Date of Patent: Sep. 1, 2015

(54) PROCESS OF PREPARING A SILOXANE COPOLYMER

(71) Applicant: DOW CORNING Corporation, Midland, MI (US)

(72) Inventors: Lok Ming Li, Midland, MI (US); Yihan Liu, Midland, MI (US); Timothy Roggow, Saginaw, MI (US); Marie-jose Sarrazin, Brussels (BE); David Selley, Bay City, MI (US); Andreas Stammer, Pont-A-Celles (BE); Paul Vandort, Sanford, MI (US)

(73) Assignee: DOW CORNING Corporation, Midland, MI (US)

( * ) Notice: Subject to any disclaimer, the term of this patent is extended or adjusted under 35 U.S.C. 154(b) by 0 days.

(21) Appl. No.: 14/219,226

(22) Filed: Mar. 19, 2014

(65) Prior Publication Data
US 2014/0206813 A1    Jul. 24, 2014

Related U.S. Application Data

(63) Continuation of application No. PCT/US2012/056118, filed on Sep. 19, 2012.

(60) Provisional application No. 61/536,082, filed on Sep. 19, 2011.

(51) Int. Cl.
| | | |
|---|---|---|
| *C04B 41/49* | (2006.01) |
| *C09K 3/18* | (2006.01) |
| *C08G 77/04* | (2006.01) |
| *C04B 41/45* | (2006.01) |
| *C09D 183/04* | (2006.01) |
| *C08G 77/38* | (2006.01) |
| *C04B 41/00* | (2006.01) |
| *C04B 41/64* | (2006.01) |
| *C04B 40/00* | (2006.01) |
| *C08G 77/12* | (2006.01) |
| *C04B 24/42* | (2006.01) |

(52) U.S. Cl.
CPC ............... *C09K 3/18* (2013.01); *C04B 40/0039* (2013.01); *C04B 41/009* (2013.01); *C04B 41/4535* (2013.01); *C04B 41/4961* (2013.01); *C04B 41/64* (2013.01); *C08G 77/045* (2013.01); *C08G 77/12* (2013.01); *C08G 77/38* (2013.01); *C09D 183/04* (2013.01); *C04B 24/42* (2013.01)

(58) Field of Classification Search
None
See application file for complete search history.

(56) References Cited

U.S. PATENT DOCUMENTS

| 5,074,912 A | 12/1991 | Liles et al. |
| 5,110,684 A | 5/1992 | Cooper |
| 5,690,860 A * | 11/1997 | LeGrow .......................... 516/33 |
| 6,074,470 A | 6/2000 | Fisher et al. |

FOREIGN PATENT DOCUMENTS

WO    WO 2008/013423 A1    1/2008

OTHER PUBLICATIONS

PCT/US2012/056118—International Search Report, Dec. 5, 2012.
PCT/US2012/056118—International Written Opinion, Dec. 5, 2012.
PCT/US2012/056118—International Preliminary Report on Patentability, Mar. 25, 2014.

* cited by examiner

*Primary Examiner* — Marc Zimmer
(74) *Attorney, Agent, or Firm* — Curatolo Sidoti Co., LPA; Joseph G. Curatolo; Salvatore A. Sidoti

(57) ABSTRACT

A process for preparing a cyclic siloxane copolymer, a water repellent composition and the use for treating porous substrates like concrete, especially reinforced concrete.

8 Claims, No Drawings

PROCESS OF PREPARING A SILOXANE COPOLYMER

CROSS-REFERENCE TO RELATED APPLICATIONS AND STATEMENT REGARDING FEDERALLY SPONSORED RESEARCH

None.

TECHNICAL FIELD

The present invention relates to a process for preparing a cyclic siloxane copolymer, a water repellent composition for treating porous substrates like concrete, especially reinforced concrete.

BACKGROUND

Imparting or improving water repellency of a substrate is desired for a number of substrates including organic or inorganic building components, for example, concrete, masonry, stucco, natural or artificial stone, ceramic, terracotta bricks, plaster board, fibre cement board, or other cement containing products, wood particle board, wood plastic composites, oriented strand board (OSB) or wood.

The desired water repellency properties are usually obtained by applying a water-repellent composition to the external surface of a substrate so as to create a water repellent coating on the substrate which protects this substrate from weathering and other deterioration. At least the outermost surface of building materials is treated in order to become waterproof.

Silicone compounds are used as water repellents due to their durability, good hydrophobicity and ease of application. First, silicone resins in solvent and methylsiliconates were used as silicone water repellent compounds. Then followed siloxane and silane based products in solvents. Next generation of water repellents is generally water based for environmental reasons and ease of use. The active ingredients contain siloxanes, silicone resins and silanes (and combinations of them). For example, U.S. Pat. No. 5,074,912 discloses a water repellent composition for treating porous substrates with an emulsion containing a siloxane which is a linear methylhydrogen-methylalkyl siloxane copolymer or a methylhydrogen-methylalkyl cyclosiloxane copolymer. However this product presents a Volatile Organic Content (VOC) of more than 100 g/l whereas emulsions having less than 100 g/l or even less than 50 g/l are desired.

WO200813423A1 describes silicone emulsions for imparting water repellency with a VOC content of below 100 g/l comprising phenylsilsesquioxane. The emulsions according to this disclosure lack however reactivity and depth of penetration in order to fulfil the requirement for long term protection of structural concrete or other porous building materials.

BRIEF SUMMARY OF THE INVENTION

The invention provides a process of preparing a siloxane copolymer by reacting
i) a 1-alkene containing from 8 to 12 carbon atoms
ii) a cyclic siloxane having the formula:

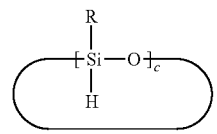

I wherein R is an alkyl radical having 1 to 3 carbon atoms; c is equal or higher than 4.
in the presence of a hydrosilylation catalyst so as to form a cyclic copolymer comprising the formula:

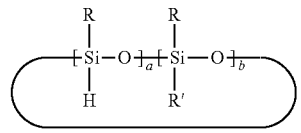

II

Where R' is an alkyl group having from 8 to 12 carbon atoms and a+b=c, removing the unreacted alkene, isomerisation products of the alkene formed and unreacted volatile cyclic hydrogensiloxane from the reaction mixture and the molar ratio alkene:cyclic siloxane being of at least 1:1, preferably of 1.2:1 and more preferably 1.5:1.

DETAILED DESCRIPTION OF THE INVENTION

All amounts, ratios, and percentages are by weight unless otherwise indicated. The articles 'a', 'an', and 'the' each refer to one or more, unless otherwise indicated by the context of specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an aryl group, an aralkyl group, or an alkaryl group includes the member alkyl individually; the subgroup alkyl and aryl; and any other individual member and subgroup subsumed therein.

We have found that the process according to the invention provides a treatment which fulfils the following requirements
a) Durable against weathering.
b) Show significant penetration into porous substrates. Some surfaces of construction materials are exposed to significant wear due to traffic. A surface treatment will therefore be removed by abrasion. Some standards for water repellents therefore include an abrasion test.
c) Having a VOC level of below 100 g/l preferably below 50 g/l according to ASTM D 5095
d) Provide high water exclusion, therefore efficiently preventing the ingress of chloride ions which can cause corrosion in the case of iron reinforced concrete.

Alkylalkoxysilanes like n-octyltriethoxysilane fulfil most of these requirements however they release alcohol during reaction with the substrate and are therefore high VOC products. E.g. n-octyltriethoxysilane which is frequently used for concrete protection e.g. as active in water based silicone water repellents has a VOC of >300 g/l.

In order to fulfil these requirements, the potential active of a low VOC water repellent emulsion for reinforced concrete should be small molecular size to allow deep penetration into the pores of the concrete, chemically reactive to the substrate or crosslinkable with itself in order to be durable, resistant to degradation at high pH and at the same time, be non-volatile, However, to be non-volatile means that the active compound needs to be above a certain molecular weight. Some of the requirements are thus conflicting.

The present invention relates to a process of reacting an alkene with a cyclic siloxane to result in an effective low VOC water repellent active compound. We have found that it is important to discard from the reaction products any unreacted reactants that are volatile, and that in addition, a minimum ratio of alkene to cyclic siloxane is required. Furthermore, the chain length of the alkene should neither be too short in order to yield a low VOC content nor too long in order to allow good penetration into porous substrates.

Preferably, the alkene is 1-octene, 1-dodecene or 1-isooctene.

Preferably, the molar ratio alkene:cyclic siloxane is at least 1.2:1.

Preferably, the molar ratio alkene:cyclic siloxane is at least 1.5:1.

Preferably, a mixture of cyclic siloxanes (structure I) is used with c being comprised between 4 and 6.

Preferably, a is less than 3 and b is equal or greater than 2.

Preferably a platinum catalyst is used for the reaction.

Preferably, the composition according to the invention has a Volatile Organic Content according to ASTM D 5095 below 100 g/l.

More preferably, the composition has a Volatile Organic Content according to ASTM D 5095 below 50 g/l.

For example the reaction may be a case as illustrated below:

The siloxane copolymer produced by the process according to the invention is usually not a pure compound, but a mixture of different siloxane copolymers, and this mixture is used to provide the composition for treating porous substrates.

The synthesis of the cyclic copolymer starting from cyclic methyl siloxanes leads to a mixture of actives that have different levels of VOC. These cyclic siloxane can either be separated using know methods such as distillation or can be used as mixtures in the final application. While a higher degree of substitution will lower the VOC it increases as well the size of the molecule and decreases the reactivity. The optimum degree of substitution will therefore be a compromise that has to be defined by VOC level required and performance testing.

The invention also provides a water repellent composition for treating porous substrates comprising an emulsion which includes water, at least one surfactant, and a siloxane copolymer obtained by the process defined herein.

In a preferred embodiment, the water repellent composition contains in addition to the siloxane copolymer other components that can provide hydrophobicity like organic oils, waxes or alkylsilanes under the presumption that the VOC level is not increased above the required value.

In a preferred embodiment, the water repellent composition contains in addition to the siloxane copolymer (cyclic copolymer) other components which preferably do not significantly affect the VOC level like for example, polysiloxanes or silicone resins.

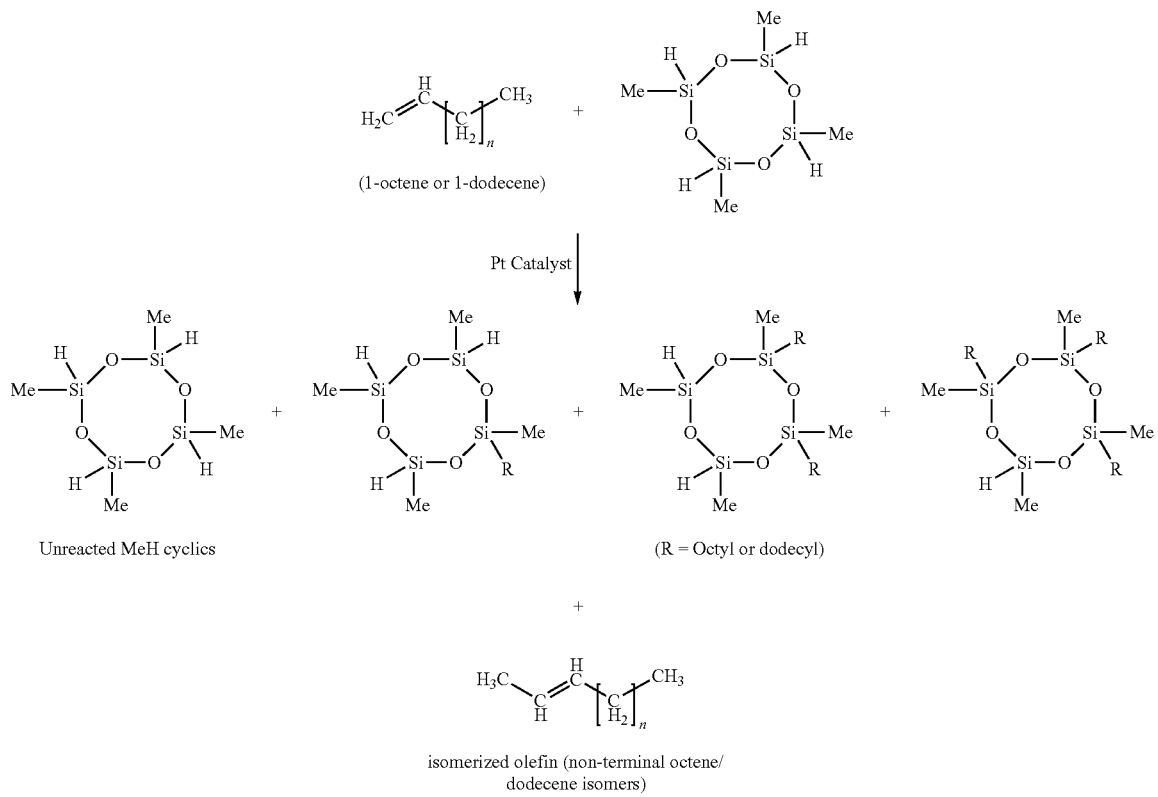

In order to provide the required low VOC, unreacted cyclic siloxane, unreacted olefin and isomerized olefin should be removed from the reaction product, for example by stripping, preferably using vacuum.

The invention further provides a process for improving the water repellency of a substrate by treating it with a composition defined above. In another preferred embodiment, improving the water repellency of a substrate is done by including the composition into the starting materials or during manufacture of the substrate.

The invention provides the use of the siloxane copolymer obtained according to the process to improve water repellency of a substrate by applying the composition to the finished substrate or by including the composition into the starting materials or during manufacture of the substrate.

Useful substrates include organic or inorganic components. Alternatively, substrates include at least one of concrete, especially reinforced concrete, masonry, stucco, natural or artificial stone, ceramic, terracotta bricks, plaster board, fibre cement board, or other cement containing products, wood particle board, wood plastic composites, oriented strand board (OSB) or wood. Alternatively, substrates may include at least one of regular concrete, high strength concrete, stamped concrete, high performance concrete, self consolidating concrete, shotcrete, cellular concrete, lightweight aerated concrete, variable density concrete, foamed concrete, lightweight or ultra-lightweight concrete, rapid strength concrete, pre-stressed concrete or reinforced concrete for use in pavements, highways/roadways, bridges/overpasses, parking structures, stadiums, precast structures, tilt up structures, drainage pipes, tunnels or reservoir structures, concrete masonry units, concrete blocks, split faced blocks, natural stone or bricks for use on building facades or foundations. Alternatively, substrates include at least one of stucco, natural or artificial stone, ceramic, terracotta bricks, plaster board, fibre cement board, or other cement containing products, wood particle board, wood plastic composites, oriented strand board (OSB) or wood.

While the siloxanes copolymer according to (II) can be used as such or in a VOC exempt solvent water based products are preferred due to their ease of use and environmental advantages.

The invention extends to a water repellent composition for improving the water repellency of substrates comprising an emulsion. Aqueous emulsions wherein the disperse oil phase is a cyclic copolymer of the formula (II) can be prepared by a number of different ways, for example, by
1) Combining
    i) Water
    ii) A siloxane copolymer obtained according to the process
    iii) A surfactant
2) Homogenizing the combined components to form an emulsion
3) Optionally admixing additional water and additional ingredients.

Alternatively, the siloxane copolymer can be dispersed into an aqueous solution or dispersion containing the surfactant under a constant mixing condition. Still alternatively, part or all of the surfactant can be combined with the siloxane copolymer and the mixture in turn is dispersed into the water. The specific sequence of combination is not critical and high shear homogenization is not absolutely necessary; the effectiveness of the emulsification procedure depends on specific surfactant package used and the procedure can be adjusted according to the desired emulsion property. The cyclic copolymer of the formula (II) can be partially or completely hydrolyzed with water prior or during emulsification to the corresponding silanols. This will not increase the VOC.

The emulsifier is a surfactant or mixture of surfactants having the ability to stabilize an aqueous emulsion. The surfactant may be an anionic surfactant, cationic surfactant, non-ionic surfactant, amphoteric surfactant, or a mixture of surfactants. Non-ionic surfactants and anionic surfactants are typically used in combination. Mixtures containing two or more non-ionic surfactants are preferred.

Representative examples of suitable non-ionic surfactants include condensates of ethylene oxide with long chain fatty alcohols or fatty acids such as a C 12-16 alcohol, condensates of ethylene oxide with an amine or an amide, condensation products of ethylene and propylene oxide, esters of glycerol, sucrose, sorbitol, fatty acid alkylol amides, sucrose esters, and fatty amine oxides. Silicone surfactant and fluoro surfactants can also be used. Representative examples of suitable commercially available non-ionic surfactants include alcohol ethoxylates sold under the trade name BRIJ, Synperonic™, Renex™ by Croda, Edison, N.J., Lutensol® by BASF (Florham Park, N.J.). Some examples are BRIJ L23, an ethoxylated alcohol known as polyoxyethylene (23) lauryl ether, and BRIJ L4, another ethoxylated alcohol known as polyoxyethylene (4) lauryl ether, Lutensol® XP-70 and Lutensol® XP-140, Synperonic 13-6 and Synperonic 13-12, all ethoxylated alcohols. Additional non-ionic surfactants include ethoxylated alcohols sold under the trademark TERGITOL® by The Dow Chemical Company, Midland, Mich., including TERGITOL® 15-S-5, TERGITOL® 15-S-12, TERGITOL® 15-S-15, and TERGITOL® 15-S-40. Sorbitan esters and their ethoxylated derivatives can also be used. Examples include those sold under the trade name Span™ and Tween™, such as Span 20, Tween 20, Span 80 and Tween 80, by Croda. Examples of silicone surfactant include silicone polyethers sold under the trade name Dow Corning® by Dow Corning Corporation, Midland, Mich., such as Dow Corning® Q2-5247 Fluid and Dow Corning® Q2-5211 Superwetting Agent. Using a silicone superwetting agent can have an enhanced water repellent effect. Such a superwetting agent can be incorporated as a part of the emulsifier package or added separately as an additive to the aqueous phase. When mixtures of surfactants are used, it is beneficial to have at least one surfactant in the mixture have a low Hydrophile-Lipophile Balance (HLB), for example, below 12, and the rest have a high HLB above 12, such that the combined effective HLB is within the range 9-20, preferably 10-18. Particularly beneficial for the emulsion of the inventive cyclic copolymer is to use a combination of emulsifiers comprising at least one co-surfactant having a low HLB and insoluble in water, and used in a fashion taught in U.S. Pat. No. 6,074,470.

Representative examples of suitable anionic surfactants include alkali metal soaps of higher fatty acids, alkylaryl sulphonates such as sodium dodecyl benzene sulphonate, long chain fatty alcohol sulphates, olefin sulphates and olefin sulphonates, sulphated monoglycerides, sulphated esters, sulphonated ethoxylated alcohols, sulphosuccinates, alkane sulphonates, phosphate esters, alkyl isethionates, alkyl taurates, and alkyl sarcosinates.

Representative examples of suitable cationic surfactants include alkylamine salts, quaternary ammonium salts, sulphonium salts, and phosphonium salts. Representative examples of suitable amphoteric surfactants include imidazoline compounds, alkylamino acid salts, and betaines.

The emulsifier can for example be used at 0.1 to 40%, preferably 0.5-10% by weight based on the weight of the cyclic copolymer. For optimum stability the aqueous phase should have a slightly acid pH, for example pH 4 to pH 6.5. Buffer solutions can be used to stabilize the desired pH. The concentration of cyclic copolymer in accordance with the present invention in such an oil-in-water emulsion can be from 1 to 85% by weight or alternatively from 5 to 80% by weight but is more preferably for example between 10 and 80% by weight of the total composition. If a secondary hydrophobing agent such as a polydimethylsiloxane is present in the emulsion, the total concentration of cyclic copolymer plus secondary hydrophobing agent can for example be from about 1 up to 80% by weight of the total composition. The concentration of emulsifier in such an oil-in water emulsion can for example be between 0.1 and 20% by weight of the total composition. Water can for example be present at 15 to 89.5% by weight of the total composition. In each instance when referred to in % values the total present is 100% and the remainder of the emulsion is made up of other ingredients, typically water and surfactant(s) and optional additives to a value of 100%.

Emulsions of cyclic copolymers in accordance with the present invention can contain various additives known in silicone emulsions, for example fillers, colouring agents such as dyes or pigments, heat stabilizers, flame retardants, UV stabilizers, fungicides, biocides, thickeners, preservatives, antifoams, freeze thaw stabilizers, or inorganic salts to buffer pH. Such materials can be added to the cyclic copolymer before or after the cyclic copolymer has been emulsified.

In a preferred embodiment, the emulsion contains in addition to the siloxane copolymer other components that can provide hydrophobicity like organic oils, waxes or alkylsilanes under the presumption that the VOC level is not increased above the required value.

In a preferred embodiment, the emulsion contains in addition to the cyclic copolymer other components which preferably do not significantly affect the VOC level like for example, polysiloxanes or silicone resins.

The emulsion can be formulated to be in the form of a gel or a cream. This can be done by using thickeners such as bentonite or montmorillonite in the emulsion or by having an active cyclic copolymer content of above 60% to 85% in the emulsion. Such creams of high organosilane content can be formed by preparing a mobile aqueous emulsion from a minor part of the organosiloxane with all of the emulsifier and water and mixing the remaining organosiloxane into the emulsion using a colloid mill, a high speed stator and rotor stirrer, or a pressure emulsification unit.

The invention encompasses the use of the composition to improve water repellency of a substrate by applying the composition to the finished substrate. In a variant, the composition is used to improve water repellency of a substrate by including the composition in the starting materials before or during manufacture of the substrate.

The invention extends to a process for improving the water repellency of a substrate by treating it with an emulsion having a Volatile Organic Content according to ASTM 5095 below 50 g/l which includes water, at least one surfactant, and a siloxane copolymer obtained by the process of Reacting
(i) 1-octene
(ii) a cyclic siloxane having the formula:

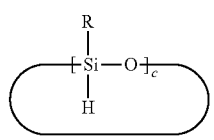

wherein R is methyl; and c is between 4 and 6,
in the presence of a platinum catalyst so as to form a cyclic copolymer having the formula:

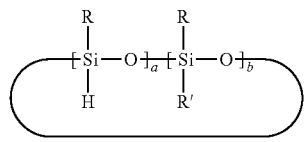

where R' is octenyl, a is less than 3 and b is equal to or greater than 2, a+b=c;
Removing the unreacted alkene and volatile cyclic siloxanes from the reaction mixture and where the molar ratio alkene:cyclic siloxanes is ≥1.5,
wherein the substrate comprises at least one of regular concrete, high strength concrete, stamped concrete, high performance concrete, self consolidating concrete, shotcrete, cellular concrete, lightweight aerated concrete, variable density concrete, foamed concrete, lightweight or ultra-lightweight concrete, rapid strength concrete, pre-stressed concrete or reinforced concrete for use in pavements, highways/roadways, bridges/overpasses, parking structures, stadiums, precast structures, tilt up structures, drainage pipes, tunnels or reservoir structures, concrete masonry units, concrete blocks, split faced blocks, natural stone or bricks for use on building facades or foundations.

The invention also provides a use of an emulsion having a Volatile Organic Content according to ASTM 5095 below 50 g/l which includes water, at least one surfactant, and a siloxane copolymer obtained by the process of Reacting
(i) 1-octene
(ii) a cyclic siloxane having the formula:

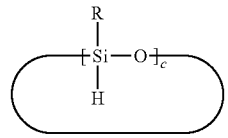

wherein R is methyl; and c is between 4 and 6,
in the presence of a platinum catalyst so as to form a cyclic copolymer having the formula:

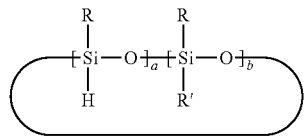

where R' is octenyl, a is less than 3 and b is equal to or greater than 2, a+b=c;
Removing the unreacted alkene and volatile cyclic siloxanes from the reaction mixture and where the molar ratio alkene:cyclic siloxanes is ≥1.5;
to improve water repellency of substrates by applying the emulsion to the finished substrate wherein the substrate comprises at least one of regular concrete, high strength concrete, stamped concrete, high performance concrete, self consolidating concrete, shotcrete, cellular concrete, lightweight aerated concrete, variable density concrete, foamed concrete, lightweight or ultra-lightweight concrete, rapid strength concrete, pre-stressed concrete or reinforced concrete for use in pavements, highways/roadways, bridges/overpasses, parking structures, stadiums, precast structures, tilt up structures, drainage pipes, tunnels or reservoir structures, concrete masonry units, concrete blocks, split faced blocks, natural stone or bricks for use on building facades or foundations The invention also provides a process for improving the water repellency of a substrate by treating it with a water repellent composition, having a Volatile Organic Content according to ASTM 5095 below 50 g/l, comprising an emulsion which includes water, at least one surfactant, and a siloxane copolymer obtained by the process of A) reacting
(i) a 1-alkene containing from 8 to 12 carbon atoms
(ii) a cyclic siloxane having the formula:

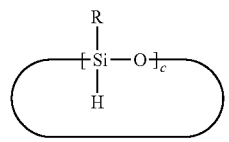

wherein R is an alkyl radical having 1 to 3 carbon atoms; c is equal to or higher than 4, in the presence of a platinum catalyst so as to form a cyclic copolymer having the formula:

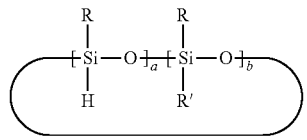

where R' is an alkyl group having from 8 to 12 carbon atoms and a+b=c;
B) removing the unreacted alkene and volatile cyclic siloxanes from the reaction mixture and where the molar ratio alkene:cyclic siloxanes is ≥1;
wherein the substrate comprises at least one of regular concrete, high strength concrete, stamped concrete, high performance concrete, self consolidating concrete, shotcrete, cellular concrete, lightweight aerated concrete, variable density concrete, foamed concrete, lightweight or ultra-lightweight concrete, rapid strength concrete, pre-stressed concrete or reinforced concrete for use in pavements, highways/roadways, bridges/overpasses, parking structures, stadiums, precast structures, tilt up structures, drainage pipes, tunnels or reservoir structures, concrete masonry units, concrete blocks, split faced blocks, natural stone or bricks for use on building facades or foundations.

The invention also provides a use of the siloxane copolymer obtained by the process of A) reacting
i) a 1-alkene containing from 8 to 12 carbon atoms
ii) a cyclic siloxane having the formula:

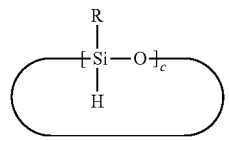

wherein R is an alkyl radical having 1 to 3 carbon atoms; c is equal to or higher than 4, in the presence of a platinum catalyst so as to form a cyclic copolymer having the formula:

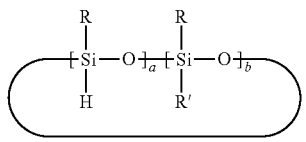

where R' is an alkyl group having from 8 to 12 carbon atoms and a+b=c;
B) removing the unreacted alkene and volatile cyclic siloxanes from the reaction mixture and where the molar ratio alkene:cyclic siloxanes is;
in a water repellent composition comprising an emulsion which includes water, at least one surfactant and the siloxane copolymer and having a Volatile Organic Content according to ASTM 5095 below 50 g/l, to improve water repellency of a finished substrate by applying the composition to the substrate, wherein the substrate comprises at least one of regular concrete, high strength concrete, stamped concrete, high performance concrete, self consolidating concrete, shotcrete, cellular concrete, lightweight aerated concrete, variable density concrete, foamed concrete, lightweight or ultra-lightweight concrete, rapid strength concrete, pre-stressed concrete or reinforced concrete for use in pavements, highways/roadways, bridges/overpasses, parking structures, stadiums, precast structures, tilt up structures, drainage pipes, tunnels or reservoir structures, concrete masonry units, concrete blocks, split faced blocks, natural stone or bricks for use on building facades or foundations.

EXAMPLES

These examples are intended to illustrate the invention and should not be interpreted as limiting the scope of the invention set forth in the claims.

Volatile Organic Content VOC

Determination of Volatile Organic (Compound) Content (VOC) for regulatory purposes is somewhat complex because expression of VOC is in terms of mass/volume (i.e. grams/litre) as prescribed by the Environmental Protection Agency and numerous regional authorities in the US and other countries; therefore VOC calculation can involve determination of individual component densities, accounting for exempt components, and in water-based formulations, factoring out the water—however, the VOC of an active ingredient or mix, or an emulsion of that active ingredient or mix is still chiefly dependent on the volatile content of the active components. For the invention, the volatile content is measured by the method ASTM 5095: *"Standard Test Method for Determination of the Nonvolatile Content (NVC) in Silanes, Siloxanes and Silane-Siloxane Blends Used in Masonry Water Repellent Treatments"* that incorporates an acid catalyst (p-toluene sulfonic acid) to aid in the reaction, and also adds a room temperature induction time to allow the reaction to occur before placing the test solutions in an oven. VOC is then calculated per EPA method 24, according to the formula:

VOC={100−NVC %−water %−exemptsol %}*
density of product (g/ml)/{1−(density of coating (g/L)*
water %)/(density of water*100)−(density of coating (g/ml)*
exemptsol %)/(density of exemptsolvent*100)}

Depth of Penetration DOP

Depth of penetration is tested after the treatment has cured for at least 7 days under standard conditions. For this the treated substrate is split with a chisel and a water-ink or water-soluble dye solution is applied to the fresh surface. The parts of the substrate that are treated will not be wetted by the ink solution while the untreated core gets stained. The distance of the so obtained line to the treated surface is measured with a ruler.

Water Exclusion

The water absorption of the treated concrete (or mortar) blocks over time was measured by the RILEM (Reunion Internationale des Laboratoires d'Essais et de Recherches sur les Materiaux et les Constructions) test II.∝(horizontal version), which is designed to measure the quantity of water absorbed by the surface (5 cm$^2$ exposed surface) of a masonry material over a defined period of time. The water absorption in ml. of each block after various times is given. An untreated concrete block was used as a reference ('ref').

Water Immersion Test

To determine the resistance of a treated substrate to water absorption under immersion conditions, a suitable concrete or mortar cube, measuring 2 inches per edge (Approx. 5 cm per edge) is treated to achieve a desired coverage rate—for instance, 0.5 litres/square meter or 150 square feet/gallon. The treated substrate is cured for the required time, weighed dry, and then immersed fully in water such that the substrate is completely covered. Water absorption is determined by removing the substrates from the water at prescribed times, blotting water from the surface, and weighing the blocks. For ease of comparison a set of untreated control blocks can also be included, and the water absorption can then be reported as a percent exclusion as compared to the (average of) untreated controls. For instance, if an untreated cube absorbs 20% water by weight, and the treated cube absorbs 2% by weight, the water exclusion versus the untreated control would be 90%.

Synthesis of Cyclic Siloxanes

A 3-neck round bottom flask was equipped with an overhead mechanical stirrer, thermometer, condenser, and pressure-compensated addition funnel which was connected on top of the condenser.

A mixture of cyclic methylhydrogen siloxanes (containing approximately 52% tetramethylcyclotetrasiloxane, 43% pentamethylcyclopentasiloxane and 5% hexamethylcyclohexaasiloxane,) was poured into the reaction vessel and the addition funnel was charged with the alpha-olefin raw material. A small portion of the alpha-olefin was added to the reaction vessel and the reaction mixture was heated to 70° C. The reaction was then catalyzed with a standard Platinum hydrosilylation catalyst (chloroplatinic acid, 0.5 ppm Pt in the reaction) resulting in a rapid exothermic increase to ~85-90° C.

Slow addition of the alpha-olefin was immediately started to maintain the reaction temperature between 90-100° C. It was important to keep the reaction temperature at or above 90° C. so that a steady state could be maintained where the reaction rate was equal to the addition rate, preventing an unsafe build-up of reactants, which could lead to a rapid, out of control exothermic reaction. After addition of the alpha-olefin was complete, the reaction mixture was allowed to gradually cool to room temperature. Then, diallyl maleate was added (0.2 wt. %) as a stabilizer.

Examples 1 to 4

Example 1

1-dodecene was reacted with a mixture of cyclic methylhydrogen siloxanes as described above using a molar ratio of alkene to SiH groups of 0.5:1. The reaction mixture was vacuum stripped. The product had a viscosity of 28 mPas at 20° C., a density of 0.915 g/ml at 20° C. and a non-volatile content of 97% (volatile content of 3%) according to ASTM D5095. The VOC content of the fluid was therefore 27.5 g/l.

Example 2

1-octene was reacted with a mixture of cyclic methylhydrogen siloxanes as described above using a molar ratio of alkene to SiH groups of 0.5:1 (it should be noted that the mixture of cyclic methylhydrogen siloxanes consists out of molecules having 4, 5 or 6 SiH groups per mol depending on the ring size). The reaction mixture was vacuum stripped. The product had a viscosity of 16 mPas at 20° C., a density of 0.928 g/ml at 20° C. and a volatile content according to ASTM D5095 of 5%. The VOC content of the fluid was therefore 46.4 g/l.

Example 3

1-octene was reacted with a mixture of cyclic methylhydrogen siloxanes as described above using a molar ratio of alkene to SiH groups of 0.6:1. The reaction mixture was vacuum stripped. The product had a viscosity of 20 mPas at 20° C., a density of 0.921 g/ml at 20° C. and a volatile content according to ASTM D5095 of 5%. The VOC content of the fluid was therefore 46.1 g/l.

Example 4

1-octene was reacted with a mixture of cyclic methylhydrogen siloxanes as described above using a molar ratio of alkene to SiH groups of 0.7:1. The reaction mixture was vacuum stripped. The product had a viscosity of 24 mPas at 20° C., a density of 0.919 g/ml at 20° C. and a volatile content according to ASTM D5095 of 3%. The VOC content of the fluid was therefore 27.6 g/l.

The cyclic copolymers from examples 1-4 were tested for as water repellents by applying them to cured concrete slabs and measuring water exclusion using the Rilem method. Concrete blocks were treated with approx. 200 g/m$^2$ active and cured at RT for at least one week. The table summarizes the water uptake in ml for different times.

| Rilem test | 5 min | 30 min | 1 h | 2 h | 8 h | 24 h |
| --- | --- | --- | --- | --- | --- | --- |
| Example 1 | 0 | 0 | 0 | 0.0 | 0.1 | 0.2 |
| Example 2 | 0 | 0 | 0 | 0 | 0.1 | 0.5 |
| Example 3 | 0 | 0 | 0 | 0 | 0 | 0.05 |
| Example 4 | 0 | 0 | 0 | 0 | 0.2 | — |
| Ref not treated | 0.6 | 2.3 | 3.9 | 4 | >4 | >4 |

The test shows that the treatment strongly reduces the water absorption versus an untreated reference. Mortar cubes were prepared according to EN 196-1 and treated by brushing them with the cyclic copolymers from example 1-4. The application rate was approx 180 g/m$^2$.

The cubes were dried for at least 1 week at Room Temperature and water absorption was measured by immersing them for during an extended period into water. The following table summarize the results, 3 cubes were tested per product and the average is reported.

| Water uptake (%) | 24 hours | 48 hours | 72 hours |
| --- | --- | --- | --- |
| Example 1 | 0.50 | 0.65 | 0.85 |
| Example 2 | 0.57 | 0.75 | 0.98 |

| Water uptake (%) | 24 hours | 48 hours | 72 hours |
|---|---|---|---|
| Example 3 | 0.71 | 0.86 | 1.08 |
| Example 4 | 0.60 | 0.74 | 0.96 |
| Ref not treated | 6.80 | 6.85 | 7.04 |

The test shows that the treatment strongly reduces the water absorption for a prolonged time versus an untreated reference. The DOP was measured for the same mortar cubes:

| DOP | mm |
|---|---|
| Example 1 | 4.5 |
| Example 2 | 4.5 |
| Example 3 | 4.5 |
| Example 4 | 4.0 |

The results show that the cyclic copolymers do penetrate deeply into the porous substrate as required to achieve good durability in construction applications.

Comparative Examples C1 to C5

Comparative Example 1

1-dodecene was reacted with a mixture of cyclic methylhydrogen siloxanes as described above using a molar ratio of alkene to SiH groups of 0.5:1. The reaction mixture was used as obtained without vacuum stripping. The product had VOC content according to ASTM D5095 of 11%. The VOC content of the fluid was therefore >100 g/l.

Comparative Example 2

1-octene was reacted with a mixture of cyclic methylhydrogen siloxanes as described above using a molar ratio of alkene to SiH groups of 0.6:1. The reaction mixture was used as obtained without vacuum stripping. The product had VOC content according to ASTM D5095 of 12%. The VOC content of the fluid was therefore >100 g/l.

Comparative Example 3

1-octene was reacted with a mixture of cyclic methylhydrogen siloxanes as described above using a molar ratio of alkene to SiH groups of 0.25:1. The reaction mixture was used as obtained without vacuum stripping. The product had VOC content according to ASTM D5095 of 16%. The VOC content of the fluid was therefore >100 g/l.

Comparative Example 4

1-dodecene was reacted with a mixture of cyclic methylhydrogen siloxanes as described above using a molar ratio of alkene to SiH groups of 0.25:1. The reaction mixture was used as obtained without vacuum stripping. The product had VOC content according to ASTM D5095 of 15%. The VOC content of the fluid was therefore >100 g/l.

Comparative Example 5 a and b a) The VOC content of tetramethylcyclotetrasiloxane (purity >99%) was measured according to ASTM D5095 and found to be 84%. The VOC content of the fluid was therefore >100 g/l.

b) The VOC content of pentamethylcyclopentasiloxane (purity ~88%) was measured according to ASTM D5095 and found to be 68%. The VOC content of the fluid was therefore >100 g/l.

The comparative examples show that without removing unreacted alkene, isomerised alkene and unreacted volatile silicone hydrogen starting materials a VOC content of below 100 g/l is not obtained.

Example 5

Preparation of a low VOC emulsion. 160.16 g of the cyclic copolymers described in example 2 were emulsified with 4.03 g of Brij L4, 5.9 g of Brij L23 (72% active surfactant in water) and 230.45 g deionized water using the following procedure:
1) Water was added in to a stainless steel beaker set on a hotplate (45° C.);
2) Surfactants were added to the heated water while mixing with a bench top mixer equipped with a propeller type mixing blade;
3) The siloxane was added to the aqueous solution and mixed for 5 minutes;
4) The content was then mixed with a rotor stator type mixer at maximum speed for two minutes to form a coarse emulsion.
5) The coarse emulsion was passed through a homogenizer 3 times at a pressure of 10,000 psi.

A white emulsion having an active siloxane content of 40% was obtained with a particle size, determined with a Malvern Mastersizer in the volume mode, of: d(0.1)=0.1887 microns, d(0.5)=0.364 microns, d(0.9)=0.541 microns.

The emulsion obtained had a VOC of <100 g/l. Concrete blocks were treated with approx 200 g/m² active of the above emulsions. The contact angle of the treated unwashed blocks was determined to be 95.4 degrees. The contact angle was again measured after washing the blocks resulting in a contact angle of 124.2 degrees.

Example 6

A low VOC emulsion was made according to the following procedure. 200 g of the siloxane copolymer of Example 2, 3.05 g of Brij L23 (72% active in water) and 2.25 g of Brij L4 were mixed in a stainless steel beaker with a magnetic stir bar. 294.71 g of water was added to the mixture and mixed with a bench top mixer equipped with a propeller and disperser blade. The content was further mixed using an Ultra Turrax® for 2 minutes at maximum speed to form a coarse emulsion. The coarse emulsion was passed three times through a homogenizer (SPX Corp., Charlotte, N.C.) at a pressure of 12,500 psi. A white emulsion was arrived having an active siloxane content of 40% and a mono-modal particle size distribution with a median at 1.049 microns as measured by a Malvern Mastersizer in the volume mode.

Concrete blocks were treated with approx 200 g/m² of the above emulsion. The contact angle of the treated unwashed blocks was determined to be 117.3 degrees. The contact angle was again measured after washing the blocks resulting in a contact angle of 132.9 degrees.

Example 7

A low voc emulsion was made according to the following procedure. 160 g of the siloxane of Example 2, 6.24 g of Dow Corning® Q2-5247 Fluid and 2.00 g of Dow Corning® 5211 Superwetting Agent were mixed in a bottle using an Ultra Turrax® at maximum speed for one minutes. 234.08 g of deionized water was added to the mixture and mixed for an additional 4 minutes to arrive at a coarse emulsion. The coarse emulsion was passed through the same homogenizer as in Example 6 three times at a pressure of 10,500 psi with cooling in between passes. A white emulsion was arrived having an active siloxane content of 40% and monomodal particle size distribution with a median at 0.469 microns as determined with a Malvern Mastersizer in the volume mode.

Concrete blocks were treated with approx 200 g/m² of the above emulsion. The contact angle of the treated unwashed blocks was determined to be 44.7 degrees. The contact angle was again measured after washing the blocks resulting in a contact angle of 92 degrees.

To evaluate resistance to water absorption, the above emulsion was applied to three concrete cubes (2 inches on each edge) at a rate equivalent to approximately 150 square feet of surface per gallon of treatment material, which is a common application rate for commercial penetrating water repellents. The treated cubes were then cured for 7 days RT before evaluating the resistance to water absorption by immersion testing. After 1 day of immersion, the average water exclusion, as compared to an untreated set of cubes, was 94.4%, and after seven days of immersion the average water exclusion was greater than 80%.

The invention claimed is:

1. Process for improving the water repellency of a substrate by treating it with an emulsion having a Volatile Organic Content according to ASTM 5095 below 50 g/l which includes water, at least one surfactant, and a siloxane copolymer obtained by the process of Reacting
(i) 1-octene
(ii) a cyclic siloxane having the formula:

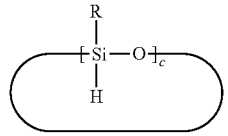

wherein R is methyl; and c is between 4 and 6, and where the molar ration alkene:cyclic siloxane is ≥1.5,
in the presence of a platinum catalyst so as to form a cyclic copolymer having the formula:

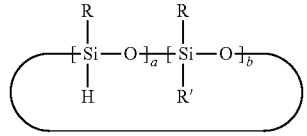

where R' is octyl, a is less than 3 and b is equal to or greater than 2, a+b=c;
Removing the unreacted alkene and volatile cyclic siloxanes from the reaction mixture;
wherein the substrate comprises at least one of regular concrete, high strength concrete, stamped concrete, high performance concrete, self consolidating concrete, shotcrete, cellular concrete, lightweight aerated concrete, variable density concrete, foamed concrete, lightweight or ultra-lightweight concrete, rapid strength concrete, pre-stressed concrete or reinforced concrete for use in pavements, highways/roadways, bridges/overpasses, parking structures, stadiums, precast structures, tilt up structures, drainage pipes, tunnels or reservoir structures, concrete masonry units, concrete blocks, split faced blocks, natural stone or bricks for use on building facades or foundations.

2. A process of utilizing an emulsion having a Volatile Organic Content according to ASTM 5095 below 50 g/l which includes water, at least one surfactant, and a siloxane copolymer obtained by the process of Reacting
(i) 1-octene
(ii) a cyclic siloxane having the formula:

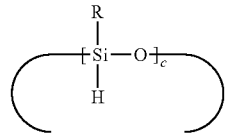

wherein R is methyl; and c is between 4 and 6, and where the molar ration alkene:cyclic siloxane is ≥1.5,
in the presence of a platinum catalyst so as to form a cyclic copolymer having the formula:

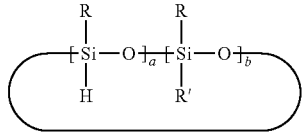

where R' is octyl, a is less than 3 and b is equal to or greater than 2, a+b=c;
Removing the unreacted alkene and volatile cyclic siloxanes from the reaction mixture; to improve water repellency of substrates by applying the emulsion to the finished substrate wherein the substrate comprises at least one of regular concrete, high strength concrete, stamped concrete, high performance concrete, self consolidating concrete, shotcrete, cellular concrete, lightweight aerated concrete, variable density concrete, foamed concrete, lightweight or ultra-lightweight concrete, rapid strength concrete, pre-stressed concrete or reinforced concrete for use in pavements, highways/roadways, bridges/overpasses, parking structures, stadiums, precast structures, tilt up structures, drainage pipes, tunnels or reservoir structures, concrete masonry units, concrete blocks, split faced blocks, natural stone or bricks for use on building facades or foundations.

3. A process for improving the water repellency of a substrate by treating it with a water repellent composition, having a Volatile Organic Content according to ASTM 5095 below 50 g/l, comprising an emulsion which includes water, at least one surfactant, and a siloxane copolymer obtained by the process of A) reacting
i) a 1-alkene containing from 8 to 12 carbon atoms
ii) a cyclic siloxane having the formula:

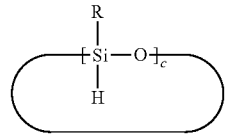

wherein R is an alkyl radical having 1 to 3 carbon atoms; c is equal to or higher than 4, and where the molar ration alkene:cyclic siloxanes is ≥1, in the presence of a platinum catalyst so as to form a cyclic copolymer having the formula:

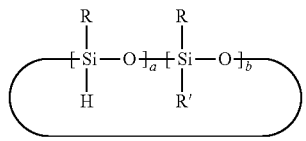

where R' is an alkyl group having from 8 to 12 carbon atoms and a+b=c;

B) removing the unreacted alkene and volatile cyclic siloxanes from the reaction mixture;

wherein the substrate comprises at least one of regular concrete, high strength concrete, stamped concrete, high performance concrete, self consolidating concrete, shotcrete, cellular concrete, lightweight aerated concrete, variable density concrete, foamed concrete, lightweight or ultra-lightweight concrete, rapid strength concrete, pre-stressed concrete or reinforced concrete for use in pavements, highways/roadways, bridges/overpasses, parking structures, stadiums, precast structures, tilt up structures, drainage pipes, tunnels or reservoir structures, concrete masonry units, concrete blocks, split faced blocks, natural stone or bricks for use on building facades or foundations.

4. The process according to claim 3 in which the alkene is 1-octene, 1-dodecene or 1-isooctene.

5. The process according to claim 3 in which the molar ratio alkene:cyclic siloxane is ≥1.5.

6. The process according to claim 3 in which a mixture of cyclic siloxanes is used with c being comprised between 4 and 6.

7. The process according to claim 3 in which a is less than 3 and b is equal to or greater than 2.

8. A process of utilizing the siloxane copolymer obtained by the process of
A) reacting
  i) a 1-alkene containing from 8 to 12 carbon atoms
  ii) a cyclic siloxane having the formula:

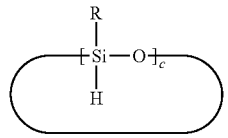

wherein R is an alkyl radical having 1 to 3 carbon atoms; c is equal to or higher than 4, and where the molar ratio alkene: cyclic siloxanes is ≥1, in the presence of a platinum catalyst so as to form a cyclic copolymer having the formula:

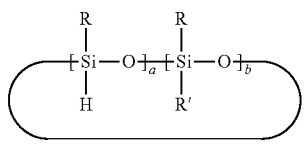

where R' is an alkyl group having from 8 to 12 carbon atoms and a+b=c;

B) removing the unreacted alkene and volatile cyclic siloxanes from the reaction mixture;

in a water repellent composition comprising an emulsion which includes water, at least one surfactant and the siloxane copolymer and having a Volatile Organic Content according to ASTM 5095 below 50 g/l, to improve water repellency of a finished substrate by applying the composition to the substrate, wherein the substrate comprises at least one of regular concrete, high strength concrete, stamped concrete, high performance concrete, self consolidating concrete, shotcrete, cellular concrete, lightweight aerated concrete, variable density concrete, foamed concrete, lightweight or ultra-lightweight concrete, rapid strength concrete, pre-stressed concrete or reinforced concrete for use in pavements, highways/roadways, bridges/overpasses, parking structures, stadiums, precast structures, tilt up structures, drainage pipes, tunnels or reservoir structures, concrete masonry units, concrete blocks, split faced blocks, natural stone or bricks for use on building facades or foundations.

\* \* \* \* \*